July 15, 1958 G. E. BARNHART 2,843,410
LATCH FOR AN AUTOMATICALLY RELEASABLE
COVER FOR A COOKING UTENSIL
Filed March 1, 1954

INVENTOR.
George E. Barnhart
BY
Donald L. Pryn
AGENT.

United States Patent Office 2,843,410
Patented July 15, 1958

2,843,410
LATCH FOR AN AUTOMATICALLY RELEASABLE COVER FOR A COOKING UTENSIL
George E. Barnhart, Altadena, Calif.
Application March 1, 1954, Serial No. 413,133
1 Claim. (Cl. 292—254)

The present invention relates generally to an improvement in cooking utensils and relates more specifically to a novel means for improving the efficiency of such cooking utensil by providing an automatic arrangement for positively terminating a cooking period in response to movement of other portions of said utensil.

While the present invention will be described and is intended for use primarily with a type of cooking device utilizing an electrically heated cooking chamber having a water reservoir, it is to be specifically understood that the device may be applied to various types of cooking utensils. The device of the present invention is intended for use with cooking utensils having various types of heating arrangements and facilities. More specifically, the present invention will be described in connection with an automatic electrically heated thermostatically controlled egg cooking device, the cooking device together with the heating arrangement and controls forming no part of the present invention but being shown and described in order that the present improvement may be properly understood and the use thereof properly defined.

Heretofore, various types of cooking utensils have utilized the principle of a means responsive to an increase in temperature beyond a predetermined limit to shut off the heating power supply to the utensil in an effort thereby to terminate cooking of food products or the like. Devices of this character have operated relatively well for the purpose intended; however, the automatic cooking arrangements have frequently relied upon a manual action of some type in termination of the transfer of heat energy to the food product being cooked. In devices that are closed as by a cover and which rely upon steam or the like to accomplish such cooking, the considerable amount of steam and heat being retained in a cooking chamber causes a continuation of the cooking of the food product after a supply of heat energy has been shut off. In these prior devices, it has been therefore necessary to carefully observe the time in which the utensil automatically shuts off and thereafter immediately lift a cover or the like in order that the cooking chamber can terminate cooking of the food product therein. Such manual lifting of the cover necessarily reduced the automatic nature of the utensil and necessitates continual surveillance thereof.

It is accordingly one object of the present invention to provide a novel cover lifting device for a cooking utensil, such cover lifting device being operable in response to movement of one or more elements of the utensil.

It is another important object of the present invention to provide a cooking utensil having a novel cover lifting device that is responsive to an increase in temperature within the utensil beyond a predetermined limit.

It is a further important object of the present invention to provide a novel cooking device that is entirely automatic thus to obviate constant surveillance thereof.

A still further important object of the present invention is to provide a cover lifting device for a cooking utensil that is relatively simple in construction, efficient in operation and economical in manufacture and that will render such utensil as being a fully automatically operated unit.

It will be hereinafter seen that the present invention has other objects, advantages, and features, some of which with the foregoing, to be set forth in the following description in which a certain embodiment of the invention has been selected for illustrative purposes only in the drawings accompanying and forming a part of the present specification, and wherein.

Figure 1:
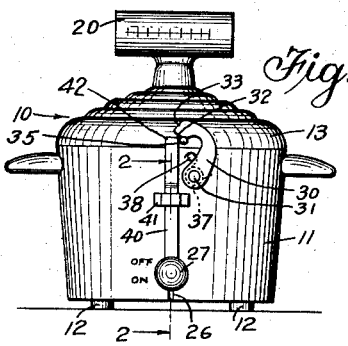
Fig. 1 is an elevation view of a cooking utensil embodying the novel cover lifting device of the present invention.

Referring to the drawing wherein like parts are indicated by like reference characters, the present invention is shown as being used in connection with a cooking utensil indicated generally at 10. The utensil 10 has a body portion 11 which is supported on suitable legs 12 and a cover 13 that is adapted to rest upon the upper portion of the body portion 11, there being a lip 14 being adapted for disposal within the upper end of the body portion 11.

Figure 2:
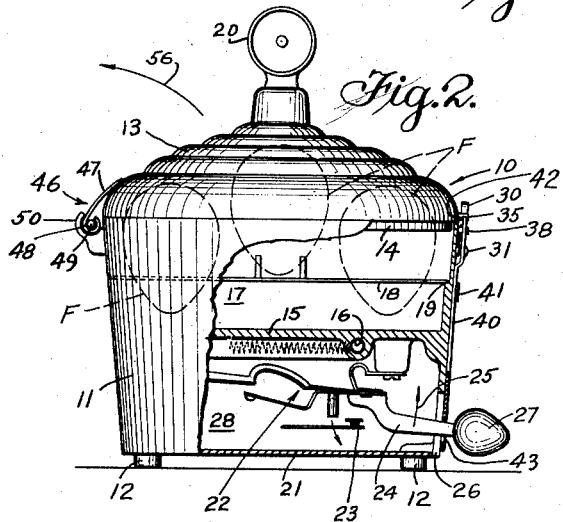
Fig. 2 is an enlarged elevational view partially in section as taken substantially as indicated by line 2—2, Fig. 1 and showing the customary heating and switch operating mechanism of utensils of this type.

As shown primarily in Fig. 2, the cooking utensil utilized by way of example in this invention is shown as having a transverse partition 15 in which a heating element shown as being an electrically heated coil 16 is disposed. The partition 15 thus defines above this partition a cooking chamber indicated at 17, this chamber being provided with a transverse rack 18 which is adapted to rest on a suitable annular shoulder 19. The rack 18 is adapted to support food products or the like as indicated at F. The chamber 17 is adapted to receive a measured amount of water or the like, which may be measured by means of a graduated unit 20 mounted conveniently on the upper end of the cover 13, this water being heated by means of the element 16 to form steam thereby to cook the food products contained on the rack 18.

When the water within the chamber 17 has been evaporated, an increased temperature will be experienced in a chamber 28 defined intermediate the partition 15 and a bottom wall 21 of the utensil. A snap action thermostatically operated spring arrangement 22 contained within the chamber 28 is adapted to be moved by such increased temperature to open a switch 23 and move a manually operated reset arm 24 in the direction of the arrow 25. The arm 24 extends outwardly beyond the outer wall of the utensil through a slot 26, there being a knob 27 mounted on the outer end of the arm 24. The thermostatically operated snap action switch operating mechanism 22 is shown merely by way of example, this structure being common and well known in utensils of the present type, additional description being unnecessary for the complete teaching of the present invention. Obviously, the switch 23 is adapted to control the delivery of electrical energy to the heating element 16.

Figure 4:
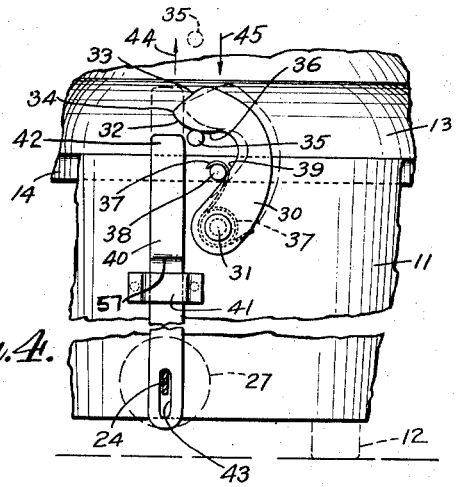
Fig. 4 is an enlarged fragmentary view showing the latching and latch releasing mechanism of the present invention.

As shown in enlarged detail in Fig. 4, a latching member 30 is pivotally supported as at 31 to the body 11 of the utensil. The upper end of the latching member 30 is provided with a pair of cam surfaces 32 and 33, these surfaces terminating in a rounded end 34. A pin 35 which defines a strike is mounted on the cover 13 and extended outwardly therefrom, this pin being adapted for cooperation with the latching member 30 and a latching surface 36 thereon to retain the cover 13 in contact with the body 11 of the utensil. The latching member 30 is biassed toward a latched position with respect to the strike 35 as by a spring 37 that is adapted to surround the pivot 31 and cooperate with a stop pin 38 which extends outwardly from the body 11 and serves to engage a surface 39 of the latching member 30 to limit movement of the latching member toward the strike 35.

A releasing member 40 for the latching member 30 is slidably disposed along the surface of the body 11 of the cooking utensil and retained in position as by a guide 41 mounted on the exterior of the body portion 11. The upper end 42 of the releasing member 40 is adapted for cooperation with the cam surface 32 of the latching member in order to move the latching member out of engagement with the strike 35 upon upward movement of the releasing member. The lower end of the releasing member 40 is provided with an elongated slot 43 in which the manual reset arm 24 of the thermostatically controlled switch operating mechanism 22 is adapted to be disposed. The various components of the present device are shown in Fig. 4 as being in position whereby the switch 23 will be closed, with the arm 24 being in its lowermost position whereby upon movement of the arm 24 as by the action of the switch operating mechanism 22, the releasing member 40 will be moved upwardly in a direction indicated by the arrow 44, thereby to engage the cam surface 32 of the latching member 30 and move the latching member out of engagement with the strike 35. As the cover 13 is closed as by movement in direction of the arrow 45, the strike 35 will engage the cam surface 33 of the latching member 30, thereby to move the latching member rearwardly as indicated by the dotted lines in Fig. 4, thus enabling the strike 35 to pass the latching member, the latching member being thereafter returned to the solid line position as by the spring 37.

Figure 6:
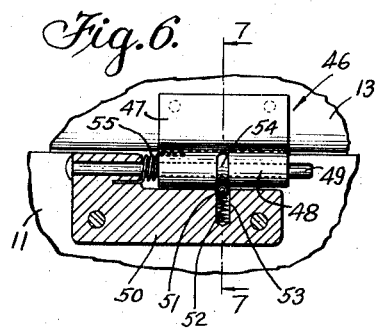
Fig. 6 is a fragmentary sectional view showing the hinge arrangement for use with the cover of the present invention.

In devices of the present character, it is customary for the covers to be merely placed on the body portion; however, it is preferable in the present arrangement to provide a suitable hinge arrangement indicated generally at 46 in Fig. 6. The hinge 46 includes an upper member 47 that is secured to the cover 13 and has a lower curved portion 48 that is adapted for cooperation with a hinge pin 49. The hinge pin 49 is mounted in the lower hinge portion 50 that is secured by any suitable means to the body portion 11 of the utensil. It is to be noted that the hinge pin 49 is secured at one end only thereby to permit the upper hinge portion 47 to slide therefrom to remove the cover 13 from the utensil. A detent ball 51 which is backed up as by a spring 52 retained in a bore 53 is adapted for cooperation with an arcuate slot 54 in the portion 48 of the upper hinge portion 47 to normally maintain the hinge portions in proper alignment with the various mating components of the utensil. A spring 55 is adapted to surround the hinge pin 49 intermediate the hinge portions 47 and 50, the construction being such that the spring 55 normally urges the hinge portions and the cover 13 in a direction of the arrow 56 in Fig. 2, thereby to bias the cover 13 toward an open position.

It will thus be seen that when the latching member 30 is moved from engagement with the strike 35 as by action of the releasing member 40 and opening of the switch 23, the cover 13 will be opened as by the force of the spring 55 thus to vent the chamber 17 to surrounding atmosphere and relieve the heat and/or steam contained therein. Such opening action of the cover 13 will terminate cooking of food products that may have been contained within the cooking chamber 17.

If it should be desired to open the cover 13 prior to opening of the switch 23 or movement of the arm 24, the releasing member 40 may be moved as by a downwardly facing step 57 or the latching member 30 may be moved manually in which cases the latching member will move from engagement from the strike 35. The slot 43 in the lower end of the releasing member 40 enables such movement of the releasing member notwithstanding that the arm 24 is in a lower position and has not been raised by action of the thermostatically operated switch operating mechanism 22.

Figure 3:
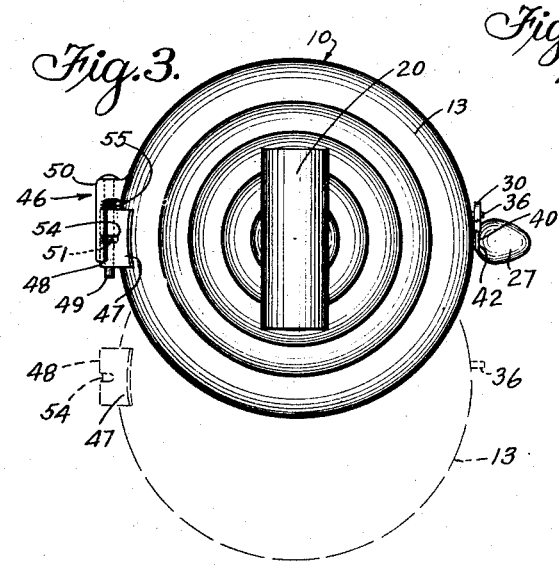
Fig. 3 is a top plan view of the cooking utensil with the cover lifting improvement attached thereto.
Figure 5:
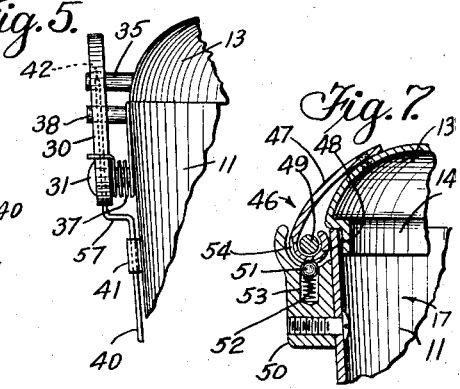
Fig. 5 is a fragmentary side elevational view of the latching mechanism.
Figure 7:
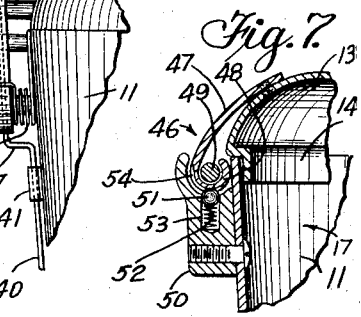
Fig. 7 is a fragmentary sectional view through the hinge as taken substantially as indicated by line 7—7, Fig. 6.

When the cover 13 has been raised from its engagement with the body portion 11, it may be seen that the cover may be easily moved to the position shown by the dotted lines in Fig. 3 to remove the cover from the body portion 11 and enable use of the measuring unit 20 contained on the cover.

It will therefore be seen that the cover lifting device of the present invention enables fully automatic operation of a cooking utensil of the type described and that constant surveillance thereof is not necessary. The added convenience of such an automatic arrangement enables the user thereof to utilize the time thus saved to prepare additional food products and/or attend to other necessary arrangements involved in the preparation and serving of such food products.

While the cover of the present device has been shown and described as being movable about a hinge line that is substantially tangent to the periphery of the body of the device, it is to be understood that with minor changes in detail design of the cooking utensil, the mechanism associated with the cover may be designed to enable the cover to rise vertically or move laterally upon release by a suitable latching mechanism. Accordingly, the invention is not to be limited to the specific type of hinge arrangement disclosed in detail by way of example.

From the foregoing description, the uses, advantages, and operation of the present invention will be readily understood by those skilled in the art to which the invention appertains. While there has been described a certain embodiment of the invention, it is desired to emphasize the fact that the invention may be applied to various types of cooking utensils, to have it understood that the example given is merely illustrative, and that the invention is not to be limited to the details disclosed herein, but is to be accorded the full scope of the appended claim.

I claim:

A latch for an automatically releasable cover for a cooking utensil comprising, in combination: a generally L-shaped planar latching member pivotally connected with said utensil and having a free end portion; a cylindrical strike mounted on said cover and positioned for cooperation with said latching member; a latching surface along one edge of said latching member; a pair of cam surfaces on said latching member adjacent said free end portion thereof and angularly extending therefrom, said latching surface being disposed between one of said cam surfaces and the pivotal connection for said latching member; and spring means surrounding said pivotal connection and engageable with said latching member for biasing said latching member in a direction toward positioning of said latching surface in latched cooperation with said strike, the other of said cam surfaces being cooperable with said strike upon closing action of said cover, said one of said cam surfaces being disposed at an angle to and cooperable with a latch release mechanism disposed on said utensil, contact of said cam surfaces with their respective cooperating elements and movement of said cover relative to said utensil serving to pivot said latching member in a direction against said biasing means.

References Cited in the file of this patent
UNITED STATES PATENTS

| | | |
|---|---|---|
| 537,836 | Lebel | Apr. 23, 1895 |
| 807,680 | Lewis | Dec. 19, 1905 |
| 2,102,342 | Walder | Dec. 14, 1937 |
| 2,269,178 | Breneman | Jan. 6, 1942 |
| 2,425,199 | Navon | Aug. 5, 1947 |
| 2,518,566 | Osterheld | Aug. 15, 1950 |
| 2,660,765 | Carlson | Dec. 1, 1953 |